United States Patent
Yu et al.

(10) Patent No.: US 7,336,080 B2
(45) Date of Patent: Feb. 26, 2008

(54) METHOD AND APPARATUS FOR USE OF THE REAL COMPONENT OF A MAGNETIC FIELD OF MULTICOMPONENT RESISTIVITY MEASUREMENTS

(75) Inventors: Liming Yu, Stafford, TX (US); Berthold Kriegshäuser, Rio de Janeiro (BR)

(73) Assignee: Baker Hughes Incorporated, Houston, TX (US)

( * ) Notice: Subject to any disclaimer, the term of this patent is extended or adjusted under 35 U.S.C. 154(b) by 157 days.

(21) Appl. No.: 10/994,830

(22) Filed: Nov. 22, 2004

(65) Prior Publication Data

US 2005/0122116 A1 Jun. 9, 2005

Related U.S. Application Data

(60) Provisional application No. 60/526,457, filed on Dec. 3, 2003.

(51) Int. Cl.
*G01V 3/10* (2006.01)

(52) U.S. Cl. .................... 324/343; 324/338; 324/339; 702/7

(58) Field of Classification Search ................ 324/343, 324/338, 339; 702/7
See application file for complete search history.

(56) References Cited

U.S. PATENT DOCUMENTS

| | | | |
|---|---|---|---|
| 3,147,429 A | 9/1964 | Moran et al. | 324/6 |
| 4,837,517 A | 6/1989 | Barber | 324/339 |
| 5,175,605 A | 12/1992 | Pavlu et al. | 257/369 |
| 5,329,448 A * | 7/1994 | Rosthal | 702/7 |
| 5,452,761 A | 9/1995 | Beard et al. | 166/250 |
| 5,703,773 A | 12/1997 | Tabarovsky et al. | 364/422 |
| 6,044,325 A | 3/2000 | Chakravarthy et al. | 702/7 |
| 6,147,496 A | 11/2000 | Strack et al. | 324/343 |
| 6,163,155 A | 12/2000 | Bittar | 324/338 |
| 6,574,562 B2 | 6/2003 | Tabarovsky et al. | 702/7 |
| 6,591,194 B1 | 7/2003 | Yu et al. | 702/7 |
| 6,636,045 B2 * | 10/2003 | Tabarovsky et al. | 324/343 |
| 2003/0146752 A1 | 8/2003 | Gianzero et al. | 324/343 |

* cited by examiner

*Primary Examiner*—Reena Aurora
(74) *Attorney, Agent, or Firm*—Madan, Mossman & Sriram, P.C.

(57) ABSTRACT

Multi-component induction measurements are made using a resistivity logging tool in an anistropic earth formation. A subset of the multi-component measurements are inverted to first determine horizontal resistivities. Using the determined horizontal resistivities and another subset of the multi-component measurements, the vertical resistivities are obtained. Results of using the in-phase signals are comparable to those obtained using multifrequency focusing of quadrature signals.

26 Claims, 11 Drawing Sheets

METHOD AND APPARATUS FOR USE OF THE REAL COMPONENT OF A MAGNETIC FIELD OF MULTICOMPONENT RESISTIVITY MEASUREMENTS

CROSS REFERENCES TO RELATED APPLICATIONS

This application claims priority from U.S. Provisional Patent Application Ser. No. 60/526,457 filed on Dec. 3, 2003.

BACKGROUND OF THE INVENTION

1. Field of the Invention

The present invention relates generally to the field of electrical field logging of oil wells. More specifically, the present invention is a method of obtaining a measure of a parameter of a formation using a real component of an electrically induced signal in a formation.

2. Description of the Related Art

It is important to the oil and gas industry to know the nature and characteristics of the various sub-surface formations penetrated by a borehole because the mere creation of a borehole (typically by drilling) usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to a transmitter signal, and then measuring a phase component signal in a receiver signal generated by the presence of the eddy currents. Variations in the magnitude of the eddy currents in response to variations in formation conductivity are reflected as variations in the receiver signal. Thus, in general, the magnitude of the in-phase component (the component that is in-phase with the transmitter signal) is indicative of the conductivity of the formation.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p.148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al.; and U.S. Pat. No. 5,452,761 issued to Beard et al.

The basic theory of induction logging instruments for evaluation of formation resistivity is taught in U.S. Pat. No. 3,147,429 to Moran and is summarized here. Shown in FIG. 1 are exemplary transmitter coil and receiver coil with a distance L between them. The transmitter has a product $A_t$ of the cross-sectional area times the number of coils. The corresponding product for the receiver coil is $A_r$. The propagation constant k is given by:

$$k = \sqrt{j\omega\sigma\mu} \quad (1)$$

where j is the square root of $-1$, $\omega$ is the angular frequency of the signal, $\sigma$ is the formation conductivity and $\mu$ is the permeability of the medium. Eqn. (1) can be rewritten as $$\gamma = \frac{1+j}{\delta} \quad (2)$$

where $\delta$ denotes the "skin depth" in the medium and is given by $$\delta = \sqrt{\frac{2}{\omega\sigma\mu}} \quad (3)$$

When a current I is passed through the transmitter, eddy currents are induced in the formation which in turn induce a magnetic field and eddy currents in the receiver. The total receiver voltage V is given by the expression:

$$V = -j\omega I \frac{\mu A_T A_R}{2\pi L^3} \left[ \begin{array}{c} 1 - \frac{(j\gamma L)^2}{2} - \frac{(j\gamma L)^3}{3} - \\ -\frac{(j\gamma L)^4}{8} - \frac{(j\gamma L)^5}{30} - \ldots \end{array} \right]. \quad (4)$$

Separating into real and imaginary parts gives the real and imaginary parts $V_r$ and $V_x$ (in-phase and quadrature components) as $$V_r = \frac{\sigma\omega^2\mu^2 A_t A_r}{4\pi L} \left[ 1 - \frac{2}{3}\left(\frac{L}{\delta}\right) + \frac{2}{15}\left(\frac{L}{\delta}\right)^2 - \ldots \right] \quad (5)$$

and $$V_x = \frac{\sigma\omega\mu I A_t A_r}{4\pi L} \left[ -1 + \frac{2}{3}\left(\frac{L}{\delta}\right)^3 - \frac{1}{2}\left(\frac{L}{\delta}\right)^4 + \frac{2}{15}\left(\frac{L}{\delta}\right)^5 \right] \quad (6)$$

It should be pointed out that the quadrature component of voltage is equivalent to the real component of the magnetic field.

A typical electrical resistivity-measuring instrument is an electromagnetic induction military well logging instrument such as described in U.S. Pat. No. 5,452,761 issued to Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages forms curves, which are also referred to as induction logs. Induction instruments that are comprised of multiple sets of receiver coils are referred to as multi-array induction instruments. Every set of receiver coils together with the transmitter is called a subarray. A multi-array induction tool consists of numerous subarrays and acquires measurements with all the subarrays.

Voltages induced in the axially more distal receiver coils are the result of electromagnetic induction phenomena occurring in a larger volume surrounding the instrument, and the voltages induced in the axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the borehole than the shorter-spaced receiver coils do. As a result, the logs of longer-spaced receiver coils have longer shoulder-bed effects than the logs of shorter-spaced receiver coils. The logs of all the receiver coils form a certain pattern.

A newly developed induction instrument comprises three mutually orthogonal transmitter-receiver arrays. Such a configuration makes it possible to determine both horizontal and vertical resistivities for an anisotropic formation in vertical, deviated, and horizontal boreholes. A description of the tool can be found in U.S. Pat. No. 6,147,496 to Strack, et al. The transmitters induce currents in three mutually perpendicular spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-direction transmitter coil and measured by a z-directed receiver. The z-direction is parallel to the borehole. Included in Strack is a teaching of how measurements made at two frequencies can be combined to give the resistivity of the earth formation away from the borehole while avoiding the effects of possible invasion of borehole fluids into the formation. Other methods for processing of multicomponent induction data use a frequency focusing method in which measurements are made at several frequencies. Examples of such methods are given in U.S. Pat. No. 6,574,562 of Tabarovsky et al.

The imaginary component of the magnetic field is commonly used in the inversion processing methods identified above. This corresponds to the real part of the voltage noted above in eqn. (5). The real component of a single frequency magnetic field measurement has similar properties to the imaginary component of a dual frequency (or multi-frequency) magnetic field measurement. So far, industry has not used the real component of magnetic field from induction logging data in data processing. The present invention is directed towards the use of the real component of the magnetic field for determination of anisotropic formation resistivity.

SUMMARY OF THE INVENTION

The present invention is a method and apparatus for logging of an earth formation including a plurality of layers having a horizontal resistivity and a vertical resistivity, at least one of the layers having a horizontal resistivity different from the vertical resistivity A logging tool is conveyed into a borehole in the earth formation. The logging tool has first and second transmitter axes inclined to each other. The first and second transmitters send electromagnetic signals at least one frequency into the earth formation. Signals resulting from interaction of the transmitted signals with the earth formation are received by suitable receivers, the received signals having a phase substantially the same as the phase of said transmitted signals. A processor is used to process the received signals to determine the horizontal and vertical resistivity of the at least one layer.

One of the two transmitters may have an axis substantially parallel to an axis of the logging tool and the other transmitter may have an axis substantially orthogonal to the first axis. Alternatively, the axes of the two transmitters may be inclined at angles other than 0° and 90° to the tool axis: in the latter case, the processor performs a rotation of coordinates of the received signals.

The processing includes defining a layered earth model of the earth formation. The received signals are inverted using the defined model. The inversion may include first determining the horizontal resistivity using a subset of the received signals. The vertical resistivity is then determined using another subset of the received signals and the derived horizontal resistivity. The invention may be practiced with measurements at either a single frequency or with measurements at a plurality of frequencies.

The processor may be located at a surface location or at a downhole location. The transmitters and receivers may be conveyed on a wireline or on a bottom hole assembly for measurement-while-drilling applications.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
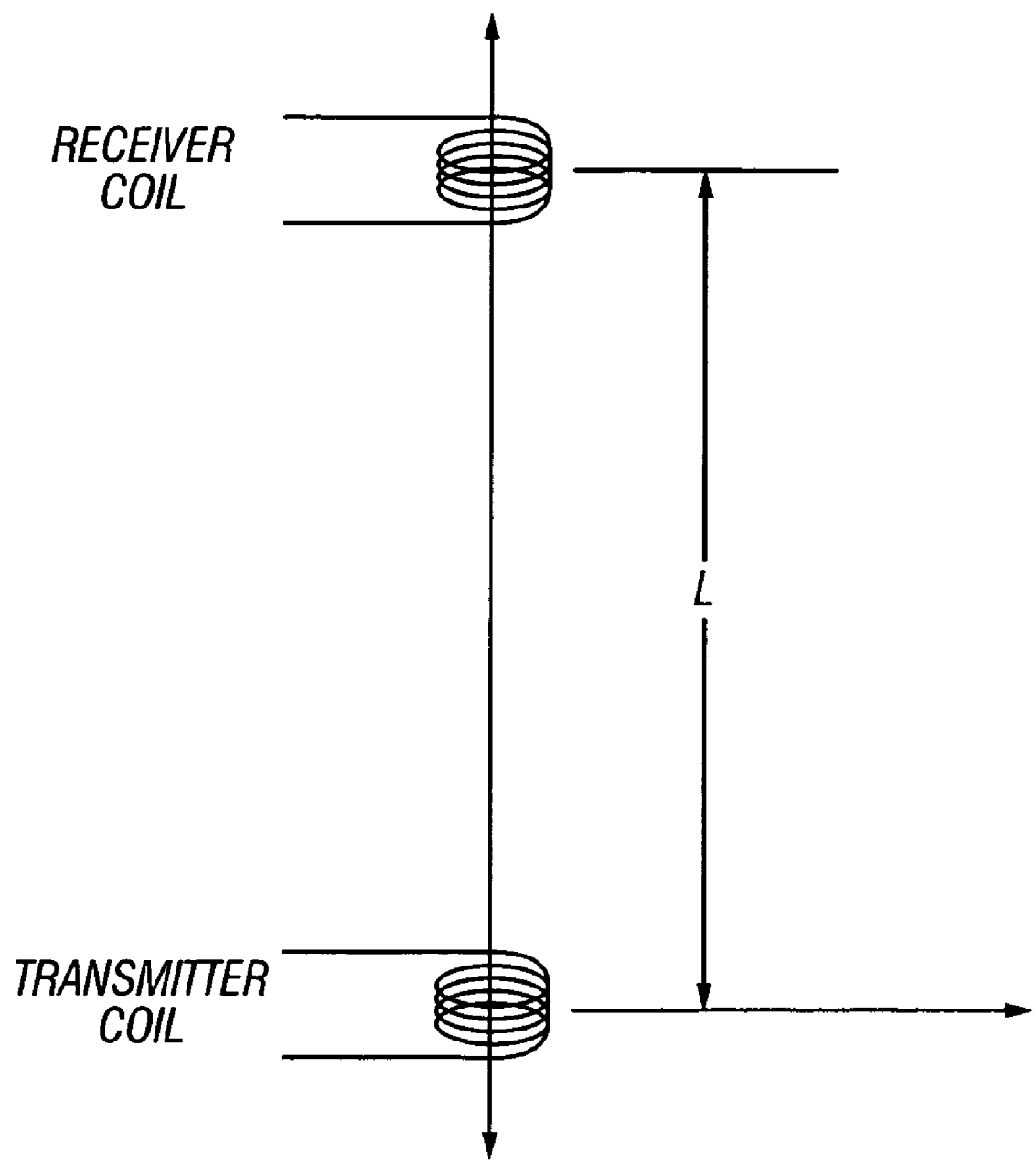
FIG. 1 (prior art) shows the geometry of coils for a prior art induction logging tool.
Figure 2:
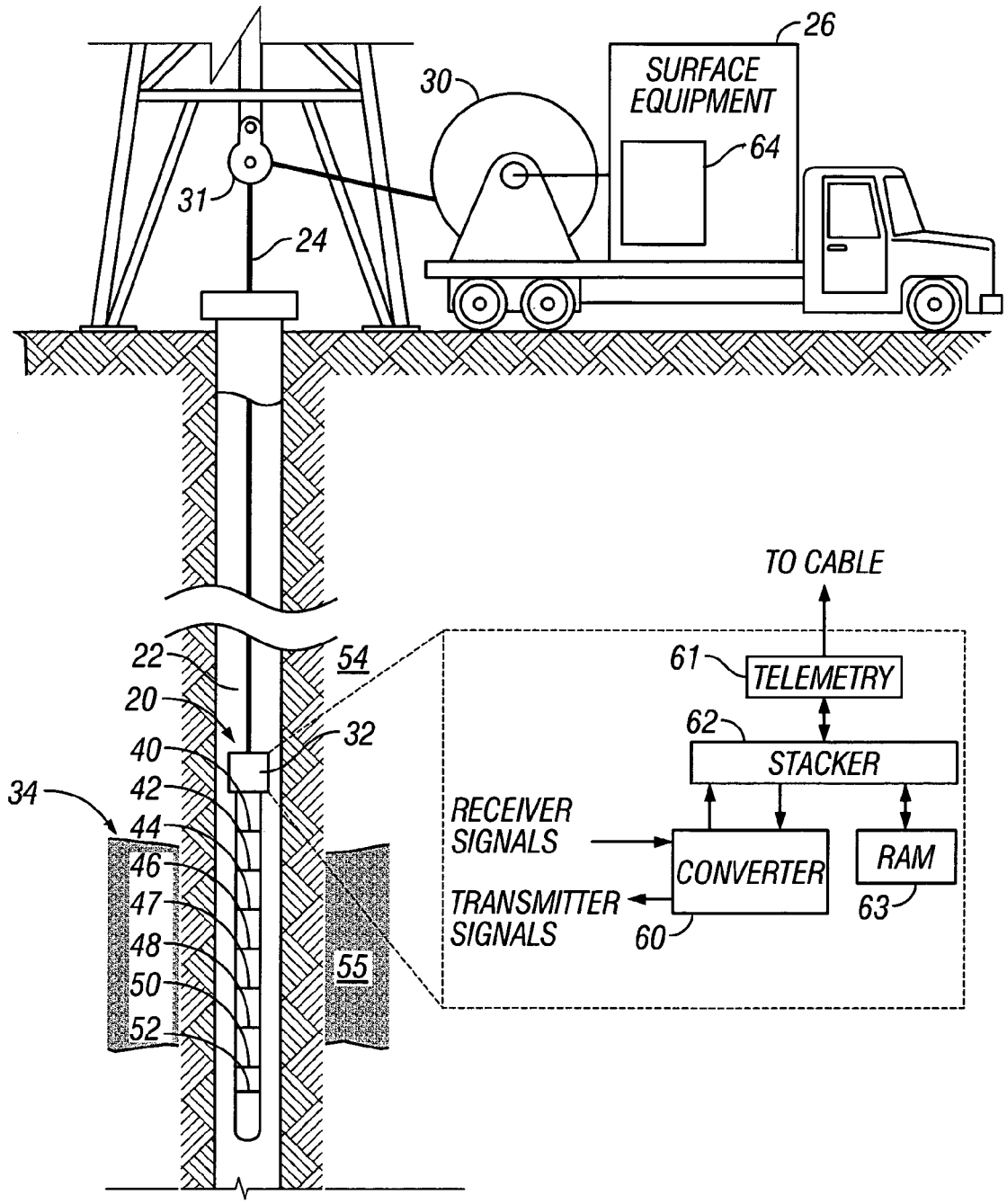
FIG. 2 (prior art) is an illustration showing an induction logging tool deployed in a borehole for measuring the conductivity of the adjacent formation.

Referring now to FIG. 2, an induction logging tool 20 suitable for use with the present invention is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which passes over a sheave 31 located at the surface of the borehole 22. The cable 24 is typically spooled onto a drum 30. The cable 24 includes insulated electric conductors for transmitting electrical signals. The electronic circuitry section 32 of the tool 20 receives signals from the sonde section 34 to perform various analog and digital functions, as will be described later.

The sonde 34 preferably includes a plurality of coils 40-52. Coil 46 is a transmitter coil for transmitting an oscillating signal into the adjacent surrounding geological formation 54. Preferably, a square wave signal is supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents, which flow coaxially with respect to the borehole 22. The magnitudes of the eddy currents are related to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity that is indicative of the possibility of containing hydrocarbons may be located.

The electronic circuitry section 32 includes a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40-52 and transforming them into digitized signals for further processing by the stacker circuit 62. The analog voltage signals provided by the receiver coils 40-52 are digitally sampled according to a predetermined sampling rate in the period defined by the fundamental frequency of the transmitter signal, which in a typical embodiment is approximately 10 kHz.

The sampling is repeated over a large number of transmitter voltage signal cycles, preferably at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40-52 can then be retrieved from the RAM 63 and can be transmitted by the telemetry circuit 61 through the cable 24 to a processor 64 which forms part of the surface equipment 26, where analyses of the stacked signals can be performed. Alternatively, processing of at least part of the data could be performed downhole using a processor at a suitable location (not shown) and results of the processing telemetered uphole.

In an alternative embodiment, a processor having sufficient digital signal processing capabilities could form part of the electronic circuitry section 32. Thus, it is contemplated that the required discrete Fourier transform could be performed downhole, which would further reduce the amount of data to be transmitted to the surface.

The measured zz signal in a borehole drilled perpendicular to a formation is responsive only to the horizontal resistivity of the earth formation. This is due to the fact that the currents induced by a z-component transmitter are in a plane parallel to bedding and are not affected by the vertical resistivity of an anisotropic formation. An x- or a y-component transmitter in a borehole drilled perpendicular to a formation, on the other hand, induces currents that flow in both vertical and horizontal directions (and also at intermediate angles). Hence the xx and yy signals are responsive to both vertical and horizontal resistivities. Commonly used inversion procedures rely on the zz signal for determination of horizontal resistivity, and this determined horizontal resistivity is used for obtaining the vertical resistivity from the xx and/or yy signals. Consequently, inverted values of vertical resistivities are less accurate than inverted values of horizontal resistivities.

Before discussing the remaining figures, we note the convention used for the tracks in FIGS. 3-8:

The term 'single' represents the imaginary component of the magnetic field obtained for a single frequency measurement;

the term 'dual' represents the imaginary component of the magnetic field obtained for a dual frequency measurement; and the term 'real' represents the real component of the magnetic field obtained for a single frequency measurement.

Figure 3:
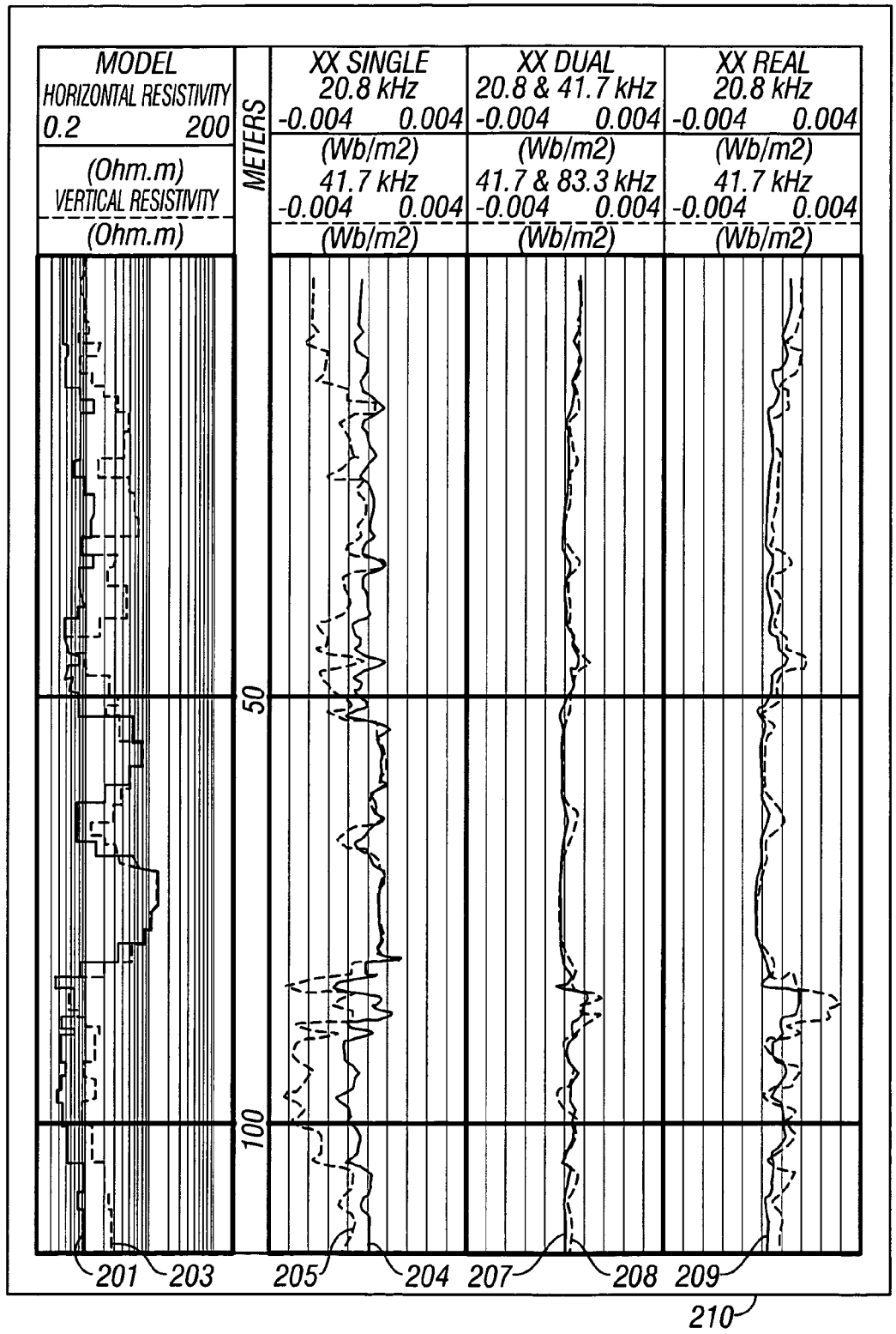
FIG. 3 shows a resistivity formation model and several logging responses to the model.

Referring now to FIG. 3, the model is shown in the first track and depicts an anisotropic formation having horizontal and vertical resistivities. 201 and 203 show the horizontal and vertical resistivities used in a model. A vertical well was used for the model, so that the XX and YY responses are identical 204 and 205 in track 2 show the XX responses for frequencies of 20.8 kHz and 41.7 kHz respectively. Track 3 shows two dual frequency responses to the resistivity model of track 1. 207 is the dual frequency response for frequencies of 20.8 kHz and 41.7 kHz respectively, while 208 shows the dual frequency response for frequencies of 41.7 kHz and 83.3 kHz respectively. Finally, track 4 shows the real responses 209 and 210 for frequencies of 20.8 kHz and 41.7 kHz respectively. The scale at the top of tracks 3 and 4 are for a range of values of ±0.004 Wb/m². It can be seen that the real component (209 and 210) generally has larger signal values than the dual frequency measurements (207 and 208).

Figure 4:
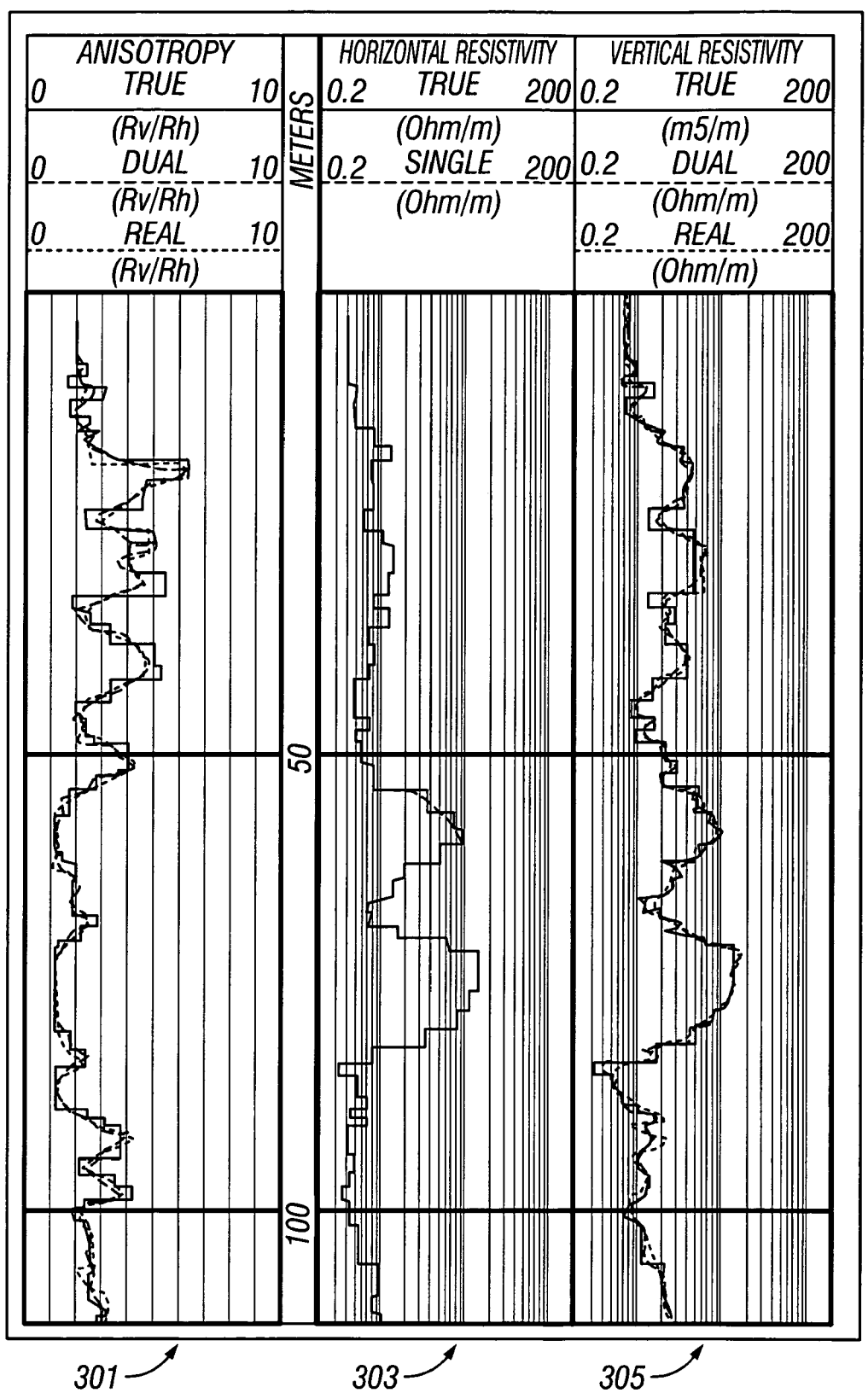
FIG. 4 shows true and obtained resistivity values for the model of FIG. 3.

FIG. 4 shows inversion results for the noise-free synthetic data in a vertical well of FIG. 3. One method for inversion of multicomponent data suitable for use in the present invention is described in U.S. Pat. No. 6,591,194 to Yu et al. having the same assignee as the present invention and the contents of which are fully incorporated by reference. Yu's method is also applicable to deviated boreholes.

As described in Yu, measurements made by a multicomponent logging tool in a borehole are inverted to obtain horizontal and vertical resistivities of a formation traversed by the borehole. The model includes layers of equal thickness, each layer having a horizontal resistivity and a vertical resistivity. For a vertical borehole, the inversion is done by first iteratively obtaining the horizontal resistivities of the layer using the $H_{zz}$ component of the data wherein in successive steps of the iteration, the horizontal resistivity for each layer is multiplied by a ratio of a model $H_{zz}$ output to the measured $H_{zz}$. The vertical resistivity model is set equal to the derived horizontal resistivities and the iterative process is repeated using the ratio of the model $H_{xx}$ output to the measured $H_{xx}$. A similar process is used for boreholes with a known inclination. For such an inclined borehole, the two horizontal components $H_{xx}$ and $H_{yy}$ are summed to give a horizontal measurement $H_{xxyy}$ that is independent of tool rotation. The first step uses a ratio of the model $H_{zz}$ output to the measured $H_{zz}$ data to obtain an apparent resistivity, and, in the second step, the ratio of the model $H_{xxyy}$ output and the measured $H_{xxyy}$ data are used along with a known relationship between the apparent resistivity and the horizontal and vertical resistivities in an iterative manner. No Jacobians or gradients are necessary in the method, so that computational times are small relative to prior art gradient methods. It should be noted that similar results can be obtained by using other inclinations of the transmitter and receiver axes to the borehole axes as long as they can be rotated into principal components (x-, y- and z- directions)

by a rotation of coordinates. While Yu discusses the inversion of dual frequency data, there is no teaching therein of inversion of the real component of data. It should also be noted that methods other than those disclosed by Yu could also be used for inversion of multicomponent data. An example of such a method is described in U.S. Pat. No. 6,643,589 to Zhang et al.

Track 1 301 shows three curves that are very similar. One is the true anisotropy of the model, a second curve shows the result of inverting the dual frequency model output of FIG. 3, while the third curve shows the results of inverting the real component model output of FIG. 3. Track 2 303 of FIG. 4 shows a comparison of the true horizontal resistivity and the results of inverting the single frequency model output. The fact that there is little difference between the curves in track 2 demonstrates the accuracy of the inversion technique. Finally, track 3 shows a comparison of the true vertical resistivity with the results of inverting the dual frequency model output and inverting the real component of the model output. The differences of the three curves of track 3 are somewhat larger than in track 2, but are still within acceptable limits. The somewhat larger differences are an indication the vertical resistivity inversion is not quite as accurate as inversion for horizontal resistivity. Reasons for the somewhat lower accuracy have been noted above.

Figure 5:
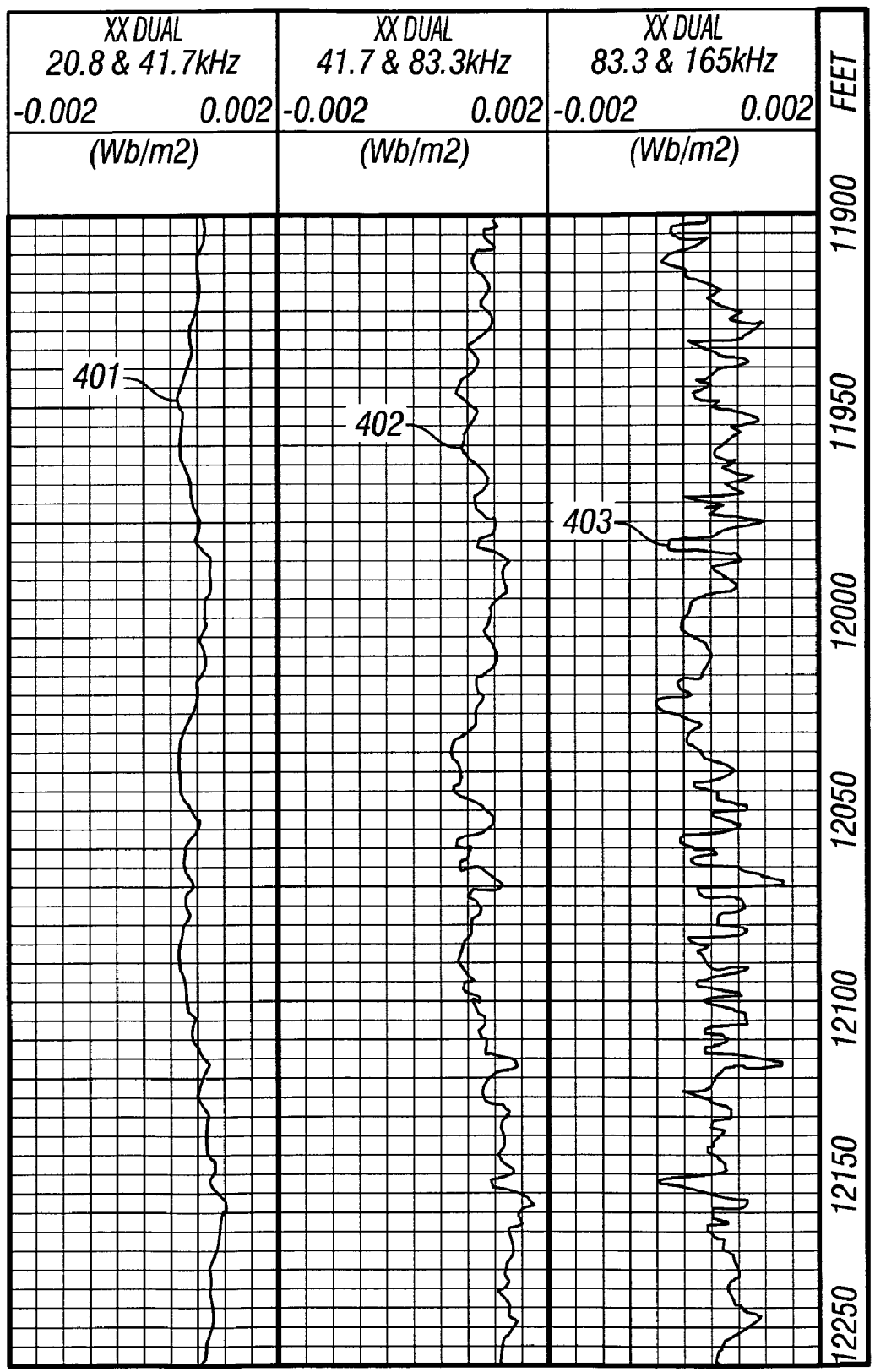
FIG. 5 shows obtained logging responses from a low-resistivity field formation.
Figure 5:
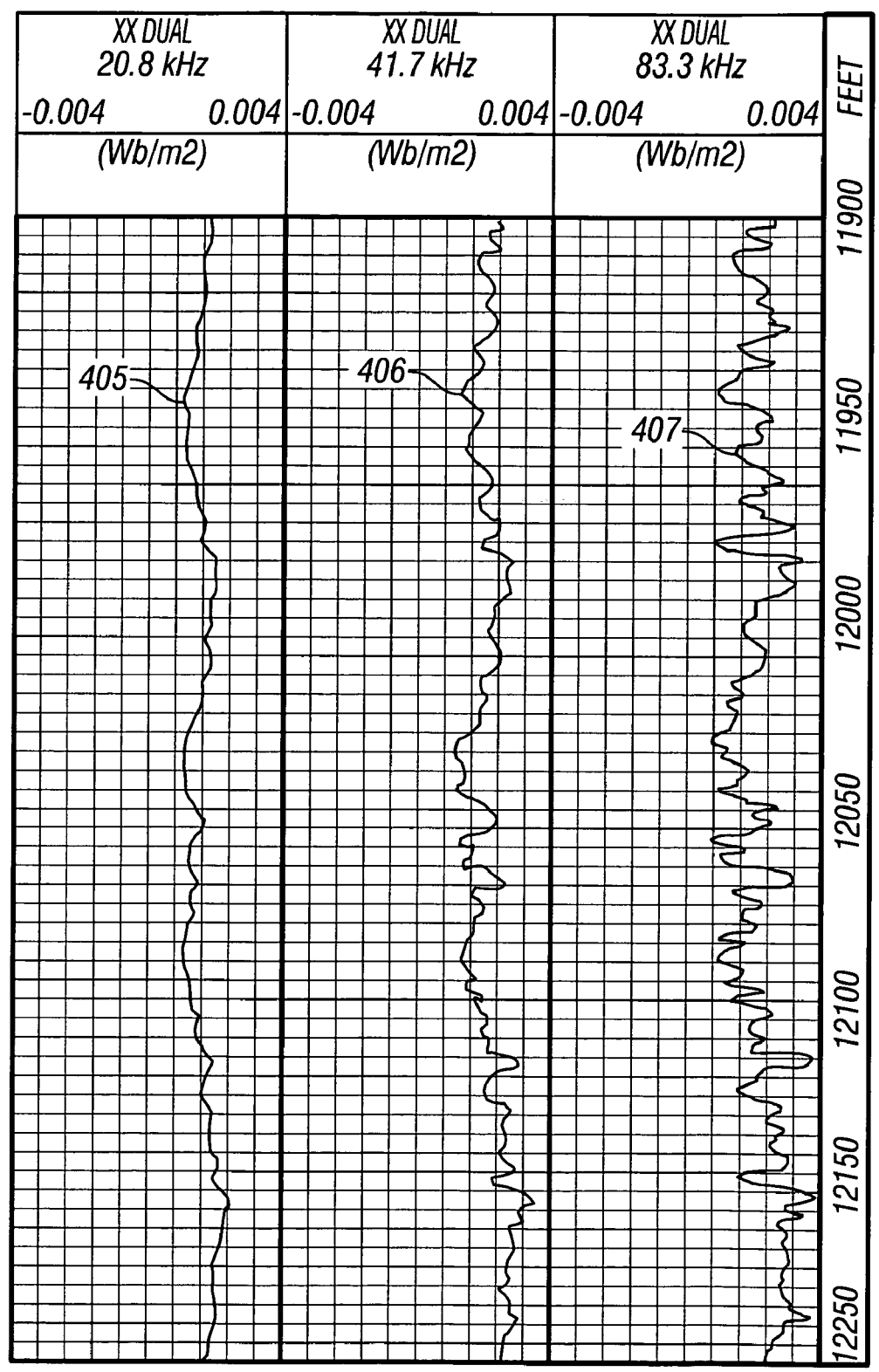

Turning now to FIG. 5, a field data for a formation having high conductivity is shown. 401, 402 and 403 are dual frequency xx measurements for frequencies of (20.8 kHz, 41.7 kHz), (41.7 kHz, 83. kHz) and (83.3 kHz and 166 kHz) respectively. 405, 406, and 407 are the real component xx measurements at 20.8 kHz, 41.7 kHz and 83.3 kHz respectively. The scale for the dual frequency measurements is ±0.002 Wb/m$^2$, while the scale for the real component measurements is ±0.004 Wb/m$^2$. FIG. 5 shows that the real component has higher signal levels than the dual frequency measurements in conductive formations. This is to be expected since the dual frequency measurement is a scaled difference between two single frequency measurements. Results of inverting the data of FIG. 5 are shown in FIG. 6.

Figure 6:
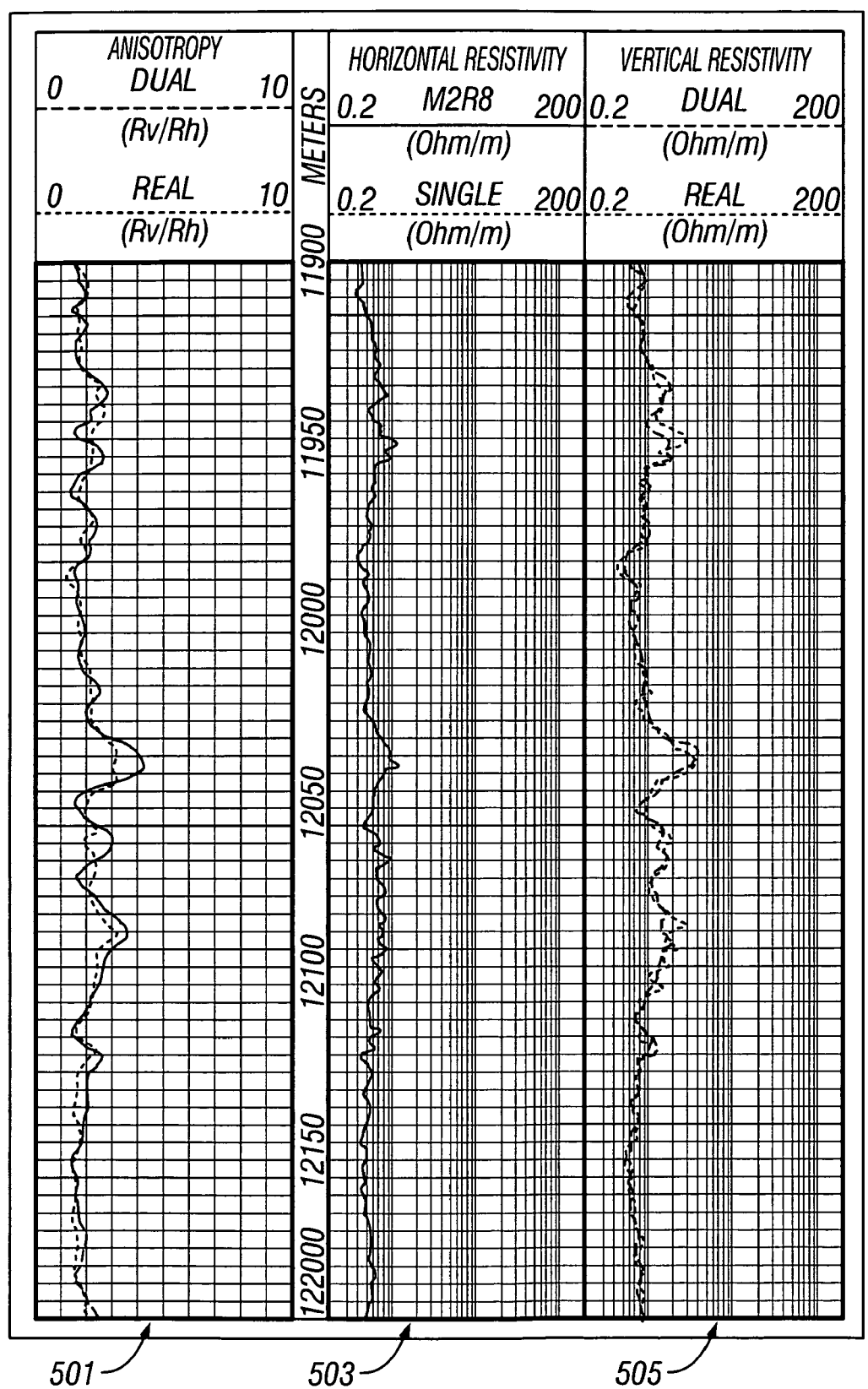
FIG. 6 shows obtained resistivity values for the low-resistivity field formation of FIG. 5.

Track 1 501 of FIG. 6 shows two interpreted anisotropy curves that are very similar to each other. One curve is from inversion of dual frequency data from FIG. 5 while the other curve is from inversion of real component data from FIG. 5. Track 2 503 of FIG. 6 shows horizontal resistivity obtained by inversion of single component data while track 3 505 shows a comparison of inverted vertical resistivity from dual and real component data. The agreement between the inverted resistivities is good, demonstrating that in conductive formations, inversion of the real component of induction measurements gives results as good as those obtained by inversion of the imaginary component of dual frequency measurements.

Figure 7:
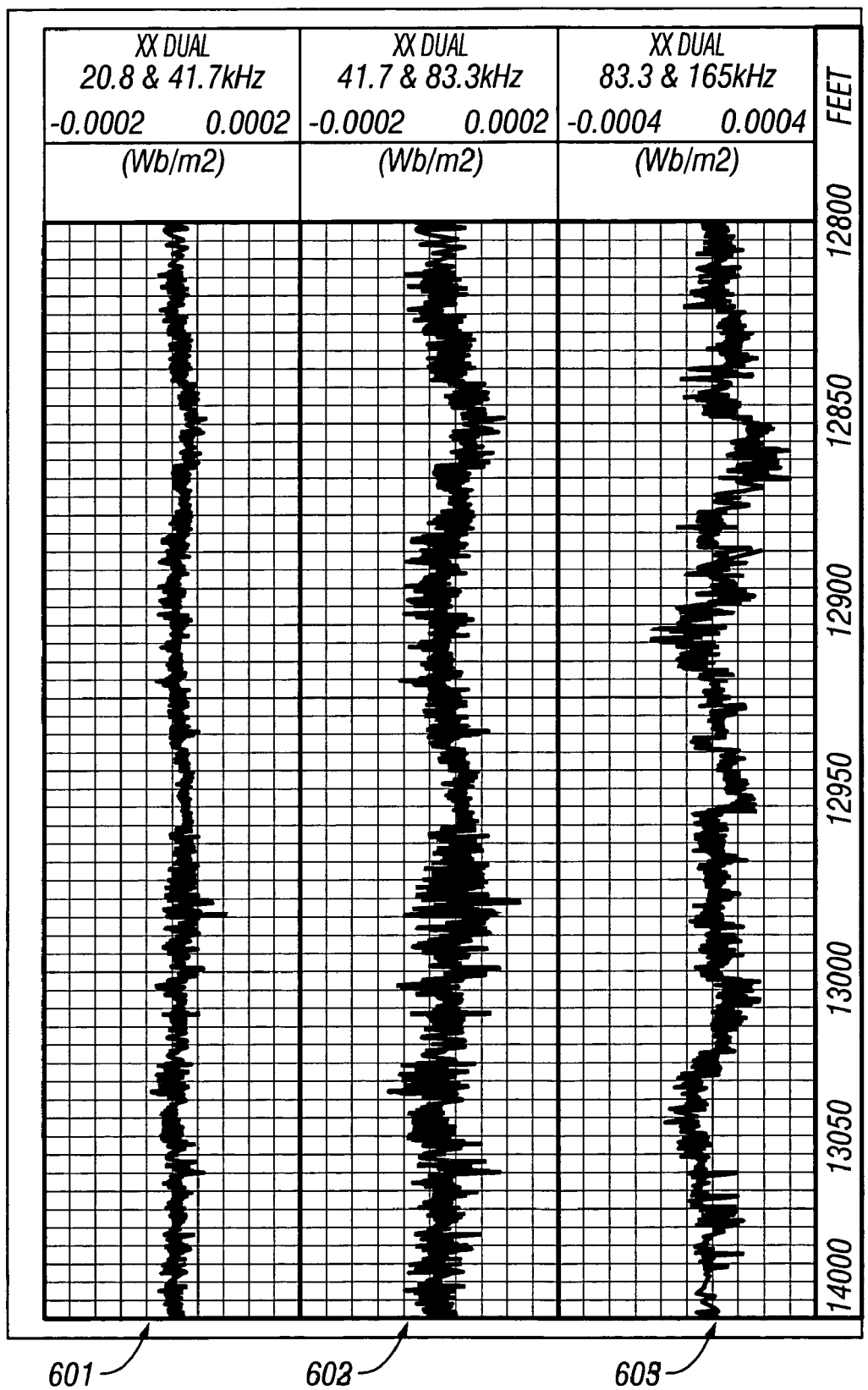
FIG. 7 shows obtained logging responses from a high-resistivity field formation.
Figure 7:
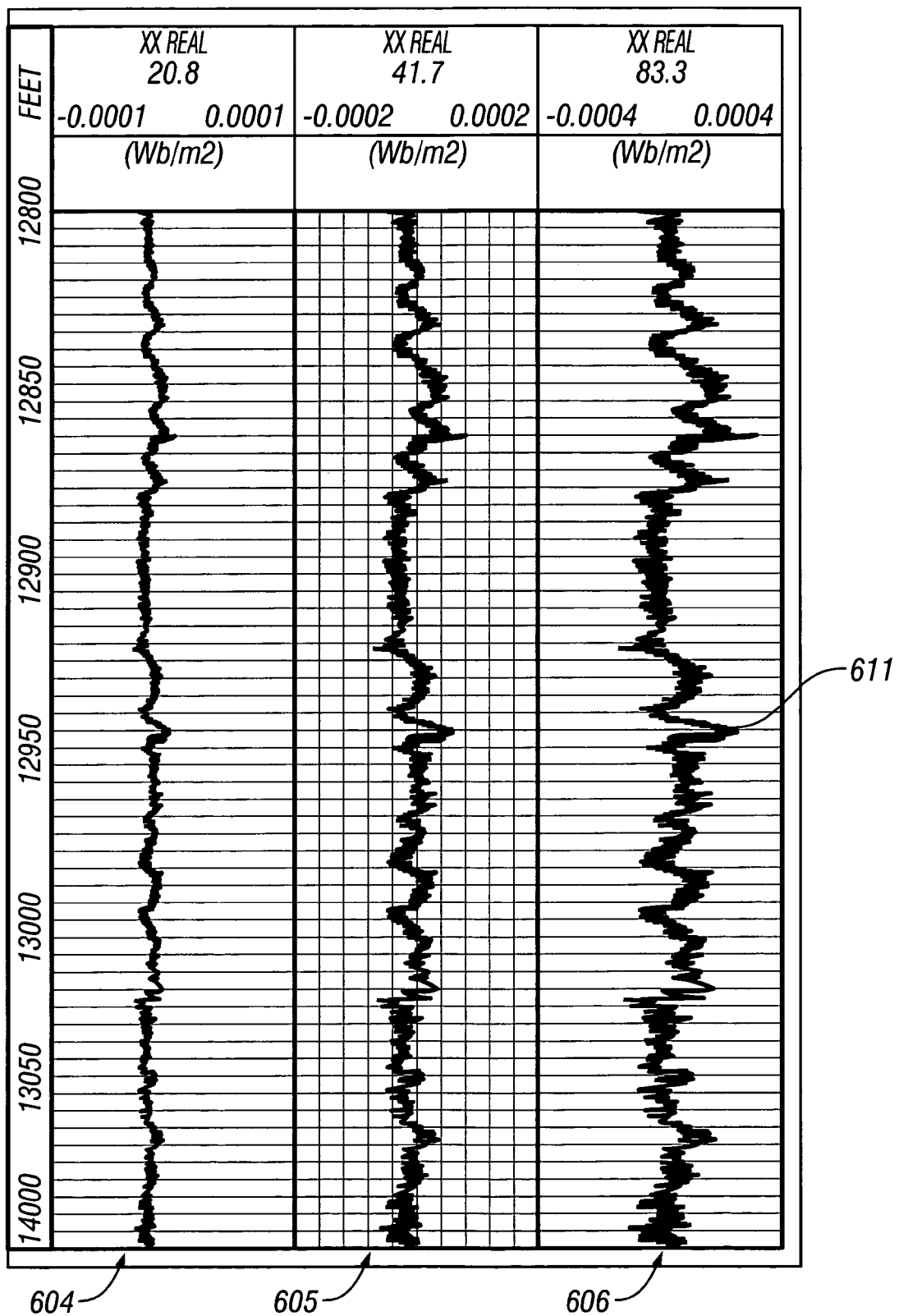

FIG. 7 shows a field example from a resistive formation that has a horizontal resistivity greater than 5 Ω-m. Track 1 shows dual frequency measurements 601 at 20.3 kHz and 41.7 kHz. Track 2 shows dual frequency measurements 602 at 41.7 kHz and 83.3 kHz, while track 3 shows dual frequency measurements 603 at 83.3 kHz and 166 kHz. Tracks 4, 5 and 6 (curves 604, 605 and 606) show real component measurements at 20.8 kHz, 41.7 kHz and 83.3 kHz respectively. The dual frequency measurements show more high frequency jitter than the real components. Compare, for example, 602 and 605. While full-scale values for the corresponding dual and real components are the same, i.e., tracks 1 and 4, tracks 2 and 5, and tracks 3 and 6, it is noted that the real component has somewhat higher signal level. This higher amplitude is most clearly seen at the depth indicated by 611.

Figure 8:
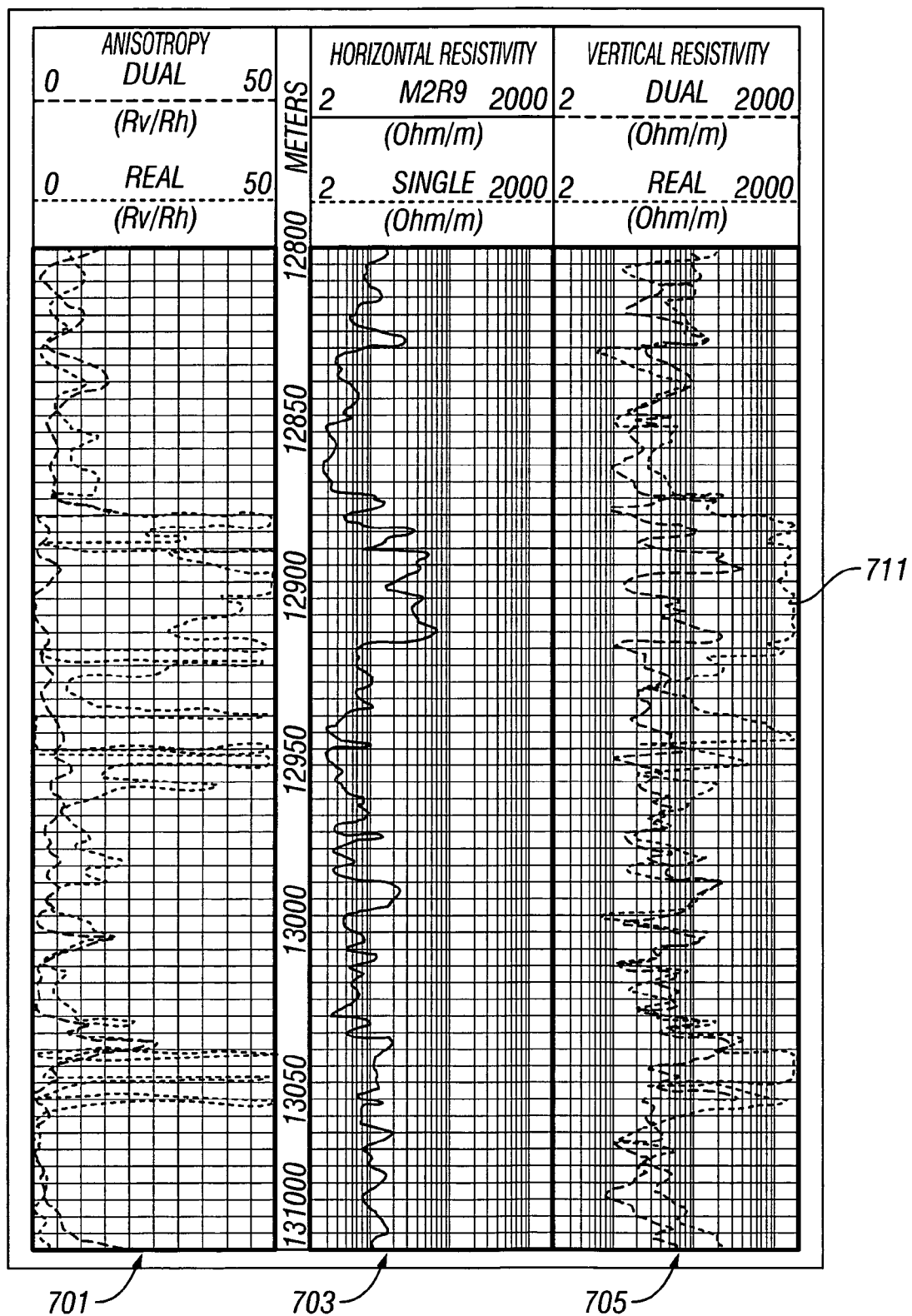
FIG. 8 shows obtained resistivity values for the high-resistivity field formation of FIG. 7.

Turning now to FIG. 8, results of inverting the data of FIG. 7 are shown. Track 1 701 shows a comparison of the inverted anisotropy from dual frequency and real component measurements. Track 2 703 shows a comparison of the inverted horizontal resistivities. Little difference is noted in track 2 between the two curves. Finally, track 3 705 shows large differences between the real and dual frequency inversions.

One possible explanation for the large excursions is the presence of an offset in the measurements. The real component measurements are inherently more susceptible to errors caused by direct coupling between the transmitter and the receiver. This is commonly addressed by the use of bucking coils in the hardware. The effects of direct coupling between the transmitter and receiver are much smaller for the imaginary component of the measured signal. Consequently, offset is more likely to be present with the real component measurement. The effect of direct coupling needs to be removed.

Thus, using the method and apparatus described above, it is possible to determine parameters of interest of an earth formation such as horizontal and vertical resistivities of one or more layers of the earth formation.

A suitable arrangement of transmitter and receiver coils for making multicomponent measurements is shown in U.S. Pat. No. 6,618,676 to Kriegshauser et al and shown in FIG. 9. Shown therein is the configuration of transmitter and receiver coils of the 3D Explorer™ induction logging instrument of Baker Hughes. Three orthogonal transmitters 801, 803 and 805 that are referred to as the $T_x$, $T_z$, and $T_y$ transmitters are shown (the z- axis is the longitudinal axis of the tool). Corresponding to the transmitters 801, 803 and 805 are associated receivers 807, 809 and 811, referred to as the $R_x$, $R_z$, and $R_y$ receivers, for measuring the corresponding magnetic fields. In a preferred mode of operation of the tool, the $H_{xx}$, $H_{yy}$, $H_{zz}$, $H_{xy}$, and $H_{xz}$ components are measured, though other components may also be used.

Figure 9:
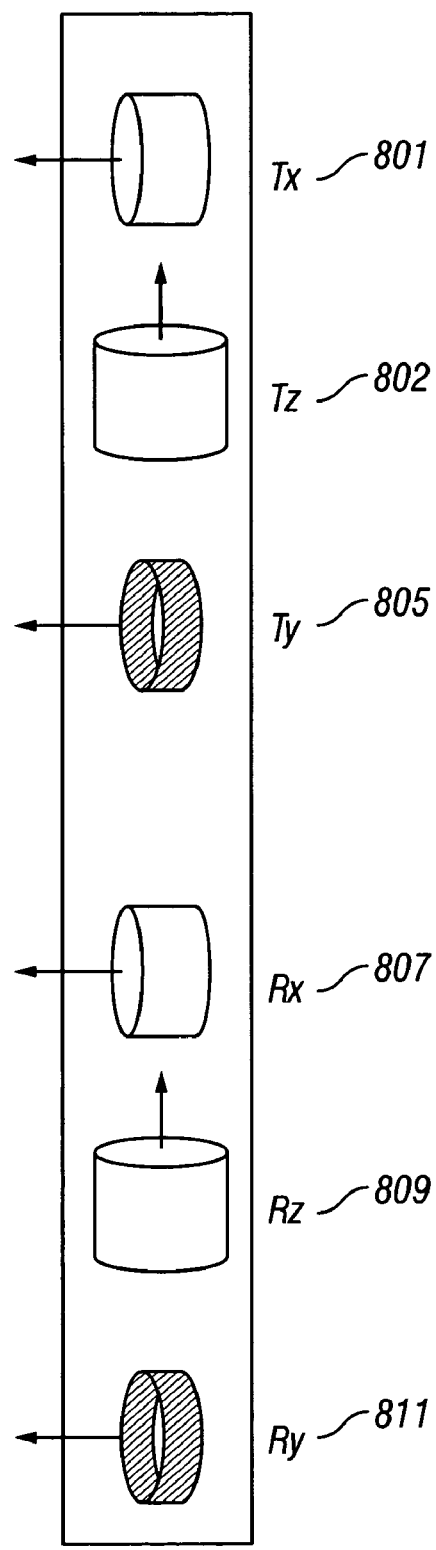
FIG. 9 (prior art) shows an arrangement of transmitter and receiver coils for making multicomponent measurements.

In FIG. 9, the transmitter and receiver coils are shown in a fixed orientation relative to the body of the logging tool. In an alternate embodiment of the invention, the transmitters and/or receivers may be gimbal mounted using methods known in the art.

The method of the present invention has been discussed above with reference to a logging device conveyed on a wireline. However, the method of the invention is equally applicable to logging devices conveyed on a bottomhole assembly for measurement-while-drilling (MWD) applications.

It should further be noted that the method of the present invention has been given using examples of a single frequency, measurement of the real component of the magnetic field. The method of the present invention could also be used with dual or multiple frequency, real component measurements.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of logging of an earth formation having a horizontal resistivity and a vertical resistivity, the method comprising:

(a) conveying a tool into a borehole in said earth formation, said tool having a first transmitter with a first axis and a second transmitter with a second axis inclined to said first axis;

(b) transmitting first and second magnetic fields into the earth formation with the first and second transmitters;

(c) receiving first and second magnetic fields resulting from the first and second transmitted magnetic fields respectively;

(d) processing components of the first and second received magnetic fields substantially in phase with the transmitted first and second magnetic fields respectively without using components of the first and second received magnetic fields substantially in quadrature with the first and second transmitted magnetic fields respectively to determine a horizontal resistivity and a vertical resistivity of the earth formation, and (e) recording at least one of the horizontal resistivity and the vertical resistivity on a suitable medium.

2. The method of claim 1 wherein the first axis is substantially parallel to an axis of the tool and the second axis is substantially orthogonal to the first axis.

3. The method of claim 1 wherein the first and second axes are inclined at angles other than 0° and 90°, and wherein the processing further comprises a rotation of coordinates.

4. The method of claim 1 wherein the processing further comprises defining a model comprising a plurality of layers, the model including a horizontal resistivity and a vertical resistivity associated with each of the plurality of layers.

5. The method of claim 4 wherein the processing further comprises inverting the first and second received magnetic fields using said model.

6. The method of claim 1 wherein the processing further comprises using a subset of the first and second received magnetic fields for determining a horizontal resistivity of at least one layer of the earth formation.

7. The method of claim 6 wherein the processing further comprises using another subset of said first and second received magnetic fields and the determined horizontal resistivity for determining a vertical resistivity for the at least one layer.

8. The method of claim 1 wherein the first and second transmitter are operated at a plurality of frequencies.

9. An apparatus for determining a parameter of interest of an earth formation, the apparatus comprising:

(a) a first transmitter with a first axis and a second transmitter with a second axis inclined to the first axis, the first and second transmitters configured to transmit first and second magnetic fields into the earth formation; (b) first and second receivers configured to receive magnetic fields resulting from the first and second transmitted magnetic fields and produce first and second signals respectively; and (c) a processor configured to:

(I) determine from components of the first and second signals substantially in phase with the transmitted first and second magnetic fields respectively without using components of the the first and second signals substantially in quadrature with the transmitted first and second magnetic fields respectively a horizontal resistivity and a vertical resistivity of at least one layer in the earth formation; and (II) record at least one of the horizontal resistivity and a vertical resistivity on a suitable medium.

10. The apparatus of claim 9 wherein the parameter of interest comprises at least one of (i) a horizontal resistivity, and, (ii) a vertical resistivity of the at least one layer.

11. The apparatus of claim 9 wherein the first and second transmitter are configured to operate at a plurality of frequencies.

12. The apparatus of claim 9 wherein the first axis is substantially parallel to an axis of a tool that canies the first transmitter and the second axis is substantially orthogonal to the first axis.

13. The apparatus of claim 9 wherein the first and second axes are inclined at angles other than 0° and 90°, and wherein the processor is further configured to perform a rotation of coordinates.

14. The apparatus of claim 9 wherein the first and said second transmitters and the receivers are configured to be conveyed on a wireline device into a borehole in said earth formation.

15. The apparatus of claim 9 wherein the first and said second transmitters and the receivers are configured to be conveyed on bottom hole assembly including a drillbit into a borehole in the earth formation.

16. The apparatus of claim 9 wherein the processor is further configured to define a model of a plurality of layers of the earth formation, the model including a horizontal resistivity and a vertical resistivity associated with each of the plurality of layers.

17. The apparatus of claim 16 wherein the processor is further configured to perform an inversion of the received magnetic fields using the model.

18. The apparatus of claim 9 the processor is at a surface location.

19. The apparatus of claim 9 wherein the processor is at a downhole location.

20. The apparatus of claim 9 wherein the first and second transmitters are gimbal mounted.

21. The apparatus of claim 9 wherein the receivers are gimbal mounted.

22. A method of logging of an earth formation, the method comprising:

(a) conveying a tool into a borehole in said earth formation;

(b) inducing a first magnetic field in the earth formation;

(c) inducing a second magnetic field in the earth formation, the second magnetic field having an axis inclined to an axis of the first magnetic field;

(d) receiving first and second magnetic fields resulting from the first and second transmitted magnetic fields respectively, the received first and second magnetic fields having a phase substantially the same as a phase of the first and second magnetic fields respectively;

(e) processing the first and second received magnetic fields without using components of the first and second received magnetic fields substantially in quadrature with the induced first and second magnetic fields respectively to determine a horizontal resistivity and a vertical resistivity of the earth formation; and (f) recording at least one of the horizontal resistivity and a vertical resistivity on a suitable medium.

23. The method of claim 22 wherein the first axis is parallel to an axis of the tool and the second axis is orthogonal to the first axis.

24. The method of claim 22 wherein the processing further comprises defining a model having a plurality of layers, each of the plurality of layers having a horizontal resistivity and a vertical resistivity.

25. The method of claim 22 wherein the processing further comprises using a subset of the received magnetic fields for determining a horizontal resistivity of at least one layer in the earth formation.

26. The method of claim 25 wherein the processing further comprises using the determined horizontal resistivity and another subset of the received magnetic fields for determining a vertical resistivity of the at least one layer.

* * * * *